United States Patent
Quinn et al.

(10) Patent No.: US 9,258,127 B2
(45) Date of Patent: Feb. 9, 2016

(54) SYSTEM AND METHOD FOR PROVIDING CRYPTOGRAPHIC VIDEO VERIFICATION

(75) Inventors: Paul Quinn, San Francisco, CA (US);
Jim Chen Chou, San Jose, CA (US);
Michael Freed, Pleasanton, CA (US);
Elango Ganesan, Palo Alto, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 213 days.

(21) Appl. No.: 13/544,220

(22) Filed: Jul. 9, 2012

(65) Prior Publication Data

US 2014/0010366 A1      Jan. 9, 2014

(51) Int. Cl.
*H04L 29/06*      (2006.01)
*H04L 9/32*       (2006.01)
*H04N 5/76*       (2006.01)
*H04N 9/82*       (2006.01)
*H04N 21/8352*    (2011.01)

(52) U.S. Cl.
CPC .............. *H04L 9/3252* (2013.01); *H04N 5/76* (2013.01); *H04N 9/8205* (2013.01); *H04N 21/8352* (2013.01)

(58) Field of Classification Search
CPC .......... H04N 21/2662; H04N 21/8455; H04N 19/00454; H04N 19/0046; H04N 19/00557; H04N 19/00927; H04N 19/00266; H04N 19/00284
USPC ........................................................ 380/200
See application file for complete search history.

(56) References Cited

U.S. PATENT DOCUMENTS

| | | | | |
|---|---|---|---|---|
| 5,499,294 A | * | 3/1996 | Friedman | 713/179 |
| 5,799,082 A | * | 8/1998 | Murphy et al. | 713/179 |
| 5,889,868 A | * | 3/1999 | Moskowitz | H04N 21/23892 382/251 |
| 6,583,813 B1 | * | 6/2003 | Enright | G06Q 20/18 348/143 |
| 6,621,979 B1 | * | 9/2003 | Eerenberg et al. | 386/346 |
| 7,296,161 B1 | * | 11/2007 | Wakao et al. | 713/176 |
| 7,983,440 B1 | * | 7/2011 | Roberts et al. | 382/100 |
| 8,667,302 B2 | * | 3/2014 | Yoshioka et al. | 713/189 |
| 2003/0011684 A1 | * | 1/2003 | Narayanaswami et al. | 348/207.99 |
| 2003/0026422 A1 | * | 2/2003 | Gerheim et al. | 380/210 |
| 2003/0123701 A1 | * | 7/2003 | Dorrell | G06F 21/64 382/100 |
| 2003/0126432 A1 | * | 7/2003 | Tonisson | 713/156 |
| 2003/0196086 A1 | * | 10/2003 | Murakami | H04N 1/32122 713/161 |
| 2003/0231249 A1 | * | 12/2003 | Nakamura | H04N 1/2158 348/231.99 |
| 2004/0034778 A1 | * | 2/2004 | Celik | 713/176 |

(Continued)

OTHER PUBLICATIONS

Beser, N., et al, 'Authentication of digital video evidence', JHU/APL, Sep. 17, 2003, entire document, http://www.jhuapl.edu/ott/technologies/featuredtech/dva/dva.pdf.*

(Continued)

*Primary Examiner* — Christopher Brown
*Assistant Examiner* — Ronald Baum
(74) *Attorney, Agent, or Firm* — Patent Capital Group (57) ABSTRACT

A method is provided in one example embodiment and includes generating a first document and a second document associated with video data that includes a group of pictures (GOPs). The method also includes hashing a plurality of video frames associated with the video data. Additionally, the method includes appending each of the video frames' respective hash and respective display times to the first document, and appending each of a plurality of I-frames' respective hash and respective display times to the second document. The method further includes communicating the first document and the second document in a reliable manner over a network to a next destination.

16 Claims, 6 Drawing Sheets

(56) References Cited

U.S. PATENT DOCUMENTS

| | | | | |
|---|---|---|---|---|
| 2004/0131184 | A1* | 7/2004 | Wu et al. | 380/202 |
| 2005/0158031 | A1* | 7/2005 | David | 386/94 |
| 2006/0036864 | A1* | 2/2006 | Parulski | H04N 1/4486 713/176 |
| 2006/0047966 | A1* | 3/2006 | Iwamura | H04N 1/32128 713/176 |
| 2006/0047967 | A1* | 3/2006 | Akhan | H04N 5/76 713/176 |
| 2007/0003102 | A1* | 1/2007 | Fujii et al. | 382/100 |
| 2007/0033419 | A1* | 2/2007 | Kocher et al. | 713/193 |
| 2007/0217612 | A1* | 9/2007 | So | 380/277 |
| 2007/0248226 | A1* | 10/2007 | Chong et al. | 380/200 |
| 2008/0134258 | A1* | 6/2008 | Goose et al. | 725/91 |
| 2009/0164793 | A1* | 6/2009 | Yoshioka et al. | 713/180 |
| 2010/0325656 | A1* | 12/2010 | Hardacker et al. | 725/31 |
| 2011/0150269 | A1* | 6/2011 | Yoshioka | 382/100 |
| 2011/0243458 | A1* | 10/2011 | Yoshioka | 382/209 |
| 2012/0019674 | A1* | 1/2012 | Ohnishi et al. | 348/207.1 |
| 2013/0208942 | A1* | 8/2013 | Davis | 382/100 |

OTHER PUBLICATIONS

Swgit, 'Digital Imaging Technology Issues for the Courts [Section 17]', Scientific Working Group Imaging Technology, Version 2.1, Jan. 15, 2011, entire document, http://www.crime-scene-investigator.net/swgit-section17.pdf.*

Grant Fredericks, "Can video be trusted?" Evidence Technology Magazine, Jun. 21, 2010, 3 pages; http://www.policeone.com/police-products/investigation/video-surveillance/articles/2085224-Can-video-evidence-be-trusted.

Evidence Technology Magazine, "The question you need to answer: Can video evidence be trusted?" © 2008, 4 pages; http://www.evidencemagazine.com/index.php?option=com_content&task=view&id=265.

Baris Coskun, et al., "Spatio-Temporal Transform Based Video Hashing," IEEE Transactions on Multimedia, vol. 8, No. 6, Dec. 2006, 19 pages.

AccessData Corporation, "The Rules of Digital Evidence and AccessData Technology," White Paper; [first published on or about May 2010]; 30 pages http://www.accessdata.com/downloads/media/Rules_of_Digital_Evidence_and_AccessData_Technology.pdf.

"The Impact of Video Evidence on Modern Policing, Research and Best Practices from the IACP Study on In-Car Cameras," Published 2005 by International Association of Chiefs of Police (IACP); 159 pages.

Ramaswamy, N., et al., "Video Authentication for H.264/AVC Using Digital Signature Standard and Secure Hash Algorithm," Proceedings of the 2006 International Workshop on Network and Operating Systems Support for Digital Audio and Video (NOSSDAV '06), Article No. 21, May 22-23, 2006, Newport, Rhode Island, 4 pages.

* cited by examiner

SYSTEM AND METHOD FOR PROVIDING CRYPTOGRAPHIC VIDEO VERIFICATION

TECHNICAL FIELD

This disclosure relates in general to the field of video security and, more particularly, to a system and a method for providing cryptographic video verification.

BACKGROUND

Use of video is prevalent in many communication contexts (live and recorded Telepresence, video calls, video broadcasts, etc.). Video security has grown in prominence in recent years. Video security is a top priority for many law enforcement organizations and governments. Video security can be used for various purposes, such as in evidentiary contexts, which would require suitable authentication to ensure that the video is unaltered/unchanged. Stated in different terminology, a video (e.g., used in courtroom) should be demonstrated to exist in its original form and, further, that the video is a true representation of an occurrence. If the video were to be altered due to certain events (e.g., packet drops, aging, etc.), these events should be detectable and suitably accounted for.

Additionally, the ability to precisely identify a tampered frame is important in the context of malicious tampering. Note that all of these security functions should be available without having to access the actual camera/source that generated the video. Many video security systems implement forms of watermarking at a source; however, these watermarking techniques can be easily defeated. Without a comprehensive video security system, fraudulent video can become common and pose a significant dilemma for security personnel, network administrators, and corporate managers alike. Protocols should be developed to verify that video has not been tampered with since its generation at its source.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment and includes generating a first document and a second document associated with video data that includes a group of pictures (GOPs). The term 'document' in this context can include any suitable object, element, message, data segment, or content that can be transmitted over the network. The method also includes hashing a plurality of video frames associated with the video data. Additionally, the method includes appending each of the video frames' respective hash and respective display times to the first document, and appending each of a plurality of I-frames' respective hash and respective display times to the second document. The 'display times' can be associated with any suitable time characteristic, or any appropriate time parameter associated with the video frame. The method further includes communicating the first document and the second document over a network (e.g., in a reliable manner) to a next destination.

In more specific implementations, the method can include using a camera's private key (e.g., any suitable secure identifier) to sign both the first document and the second document before communicating the first document and the second document over the network. Additionally, other example embodiments can include extending frame data associated with the plurality of video frames to include a display timestamp indicative of a time passed since a last time of update. In addition, certain example methodologies may include using the first and second documents to verify an authenticity of at least a portion of the video data. The term 'authenticity' includes any characteristic associated with video integrity, the originality of the video (e.g., as being representative of what was initially captured by a given device such as a camera), the veracity of the video, the reliability of the video, the accuracy of the video, the validity of the video, the legitimacy of the video, the genuineness of the video, etc.

The first document can include frame data associated with one or more GOPs. The second document can include I-frame data associated with a set of GOPs. Individual frames of the video data received over the network can be independently verified. The method can also include authenticating a camera (where a mutual authentication may occur with a video surveillance manager), and capturing the video data after the camera has been authenticated. In yet other example implementations, the method can include determining that a particular portion of video has been thinned via frame dropping; and utilizing the second document to process additional video data.

Example Embodiments

Figure 1:
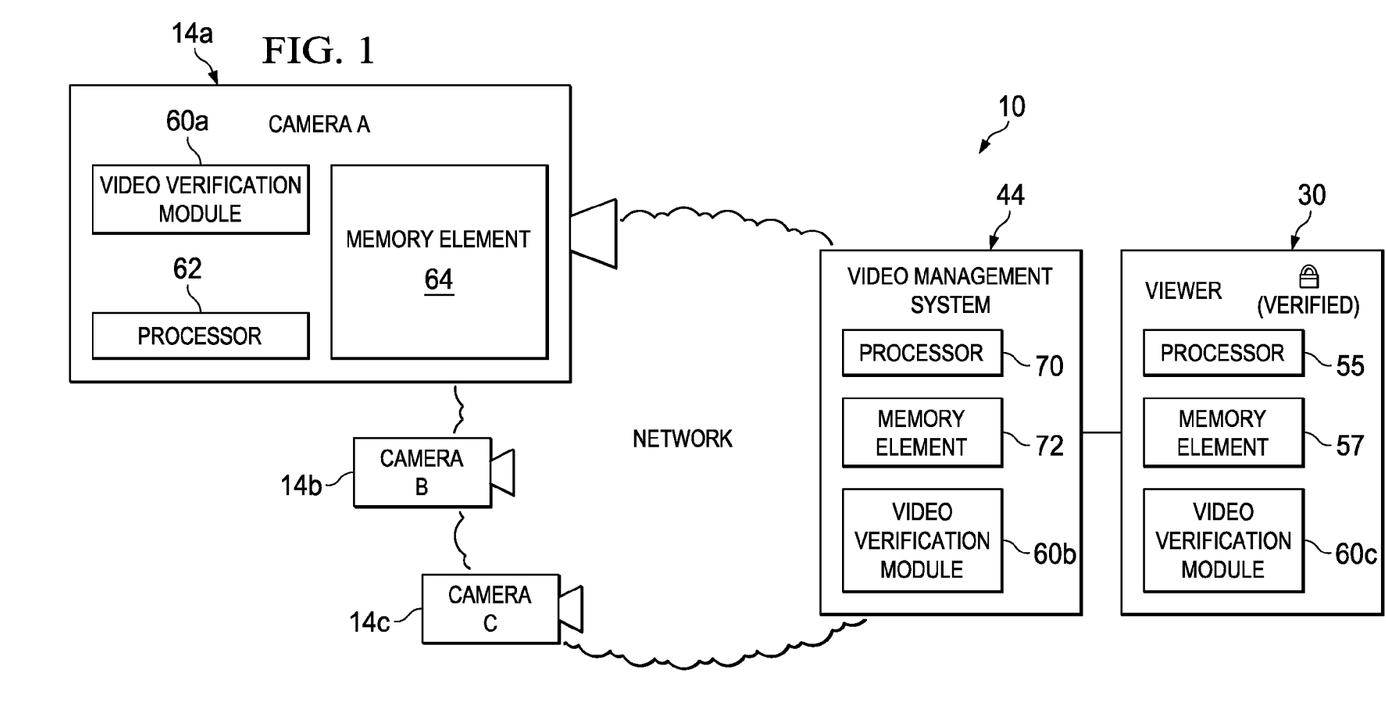
FIG. 1 is a simplified block diagram illustrating an example configuration of a cryptographic video verification system in accordance with one embodiment of this disclosure.

Turning to FIG. 1, FIG. 1 is a simplified block diagram of an example configuration of a cryptographic video verification system 10 in accordance with an embodiment of the present disclosure. Cryptographic video verification system 10 may include a plurality of cameras 14a-c (labeled 'camera A', 'camera B', and 'camera C'). Camera 14a is representative of a data source in this particular example in which a target area may be monitored for security reasons. The captured video may be suitably processed, transmitted over a network, cached, or simply stored at the camera itself. In operation, camera A can chunk the video data into data blocks consisting of one or more group of pictures (GOPs) (e.g., beginning with an I-Frame), as further detailed below.

Also provided in FIG. 1 is a viewer 30, which can be representative of a video playing component that may be modified to perform the verification activities discussed herein. For example, a generic media player, a QuickTime player, a Real-Time player, an Adobe Flash player, a handheld device, etc. can be modified to perform the verification activities discussed herein. FIG. 1 may also include a video management system (VMS) 44 (e.g., a VSM manufactured by Cisco Systems, Inc. of San Jose, Calif.), which may be suitably coupled to the network. Data blocks propagating in the architecture of FIG. 1 could be chunked for hypertext transfer protocol (HTTP) adaptive streaming in certain implementations of the present disclosure.

Captured video can be recorded at any level in the architecture of FIG. 1. For example, video can be recorded on the camera itself, on a media server on the edge of the network, on a centralized media server cluster, any location within a cloud, etc. Similarly, when the video is received, it can be stored in the camera itself, a central location, a suitable database, etc. Each camera of the architecture can support local recording, encryption, single-stream based data redundancy, or any other suitable features that may be particular to a certain entity, or type of surveillance. In regards to management, the architecture of the present disclosure can offer a unified video lifecycle including configuration, fault management, audit, performance management, access control, streaming to various clients, searching, analytics data mining, backup, grooming, thinning, smart summarization, etc.

In the particular instance of FIG. 1, camera A includes a video verification module 60$a$, a processor 62, and a memory element 64. Note that all of the other cameras in the system can include similar infrastructure such that the management of video being captured is consistent. In addition, FIG. 1 illustrates VSOM 44 as including a processor 70, a video verification module 60$b$, and a memory element 72. Similarly, viewer 30 may include a processor 55, a memory element 57, and a video verification module 60$c$. In operation, VSOM 44 can support HD clip upload, SD streaming, zero video loss, etc. Additionally, VSOM 44 can act as an RTP/RTSP dynamic proxy for live video, HTTP cache/proxy for recorded video, include video on camera in its backup policies, etc.

Note that FIG. 1 is a logical representation of cryptographic video verification system 10 that is independent of the underlying network infrastructure. Each of the elements of FIG. 1 may couple to one another through simple interfaces, or through any other suitable connection (wired or wireless), which provides a viable pathway for network communications. Additionally, any one or more of these elements of FIG. 1 may be combined or removed from the architecture based on particular configuration needs. Cryptographic video verification system 10 may include a configuration capable of transmission control protocol/Internet protocol (TCP/IP) communications for the transmission or reception of packets in a network flow. Cryptographic video verification system 10 may also operate in conjunction with a user datagram protocol/IP (UDP/IP), Fibre Channel over Ethernet (FCoE), or any other suitable protocol where appropriate and based on particular needs.

For purposes of illustrating certain example embodiments of cryptographic video verification system 10, it is important to understand certain activities and communications occurring within a typical security system framework. Contextual information is provided below to offer an overview of the challenges encountered in managing sensitive video, which should be authenticated. Such information is offered earnestly and for teaching purposes only and, therefore, should not be construed in any way to limit the broad applications of the present disclosure.

Many of the existing video authentication schemes cater to an entertainment industry use case, which adds digital watermarks that survive across video transformation (e.g., transcoding and analog re-recording). These schemes cannot be used for validating that any part of the video has not changed because their focus is on source fingerprinting and not on authenticity and integrity. Moreover, watermarking techniques can readily be falsified, which undermines their credibility. For example, video editing software can be used to manipulate watermarks.

Certain embodiments of the present disclosure can create a cryptographically secure method for video authentication that uses signed hash documents for frame authenticity checking. More specifically, the architecture can offer a hybrid security scheme in which each frame can be hashed independently, retained, and signed as a group for N GOPs. Note that the verification signature overhead for such a scheme remains low. For example, for a 30 fps 1 Mbps stream, the estimated overhead is 0.8% employing secure hash algorithm-256 (SHA-256).

In certain implementations, the architecture of FIG. 1 can be configured for adding a "display time" to frame and frame hashes to allow checking frame display times. Also, the architecture is configured for adding a "time-since-last-time-update" to frames and frame hashes, to allow checking video verification strength. In addition, the architecture is hashing each of the frames (or slices) independently, explicitly listing frame hashes for N GOPs in a document, and signing the document. Subsequently, the documents should be transmitted in a reliable manner. In at least one sense, the system is using multiple signed documents to support a smart video aging. Such a scheme can be extended to scalable video coding (SVC) video and audio, along with voice. Video verification based on the proposed scheme can be offered for both file-based and stream-based consumption. In addition, the scheme of the present disclosure does not break existing standards based media players (e.g., VLC).

Furthermore, the architecture of the present disclosure allows for thinning (a requirement for certain physec applications) and operates in a compressed domain. Hashing can occur at the network abstraction layer (NAL), as well as at various other layers, where appropriate. The architecture can extend existing cryptographic schemes (one-way hashes and digital signatures) to video for verification. In one particular implementation, a PKI-based trust relationship can be initially established between cameras and management stations (e.g., VSOMs). Subsequently, one-way hashes and digital signatures are employed in the camera (e.g., directly at the video source), to digitally sign media: providing integrity, authenticity, and non-repudiation for the particular video segment.

The scheme can be designed in conjunction with an embedded system with limited computing capacity and, further, allows the RSA signature intervals to be "stretched out" to reduce the computing requirements, while maintaining the ability to address packet drops. Additionally, the architecture of FIG. 1 protects against timestamp attacks. In addition, in the proposed scheme, assertion of camera ownership can be achieved without a per-device end-user certificate, which allows for greater scalability.

Figure 2:
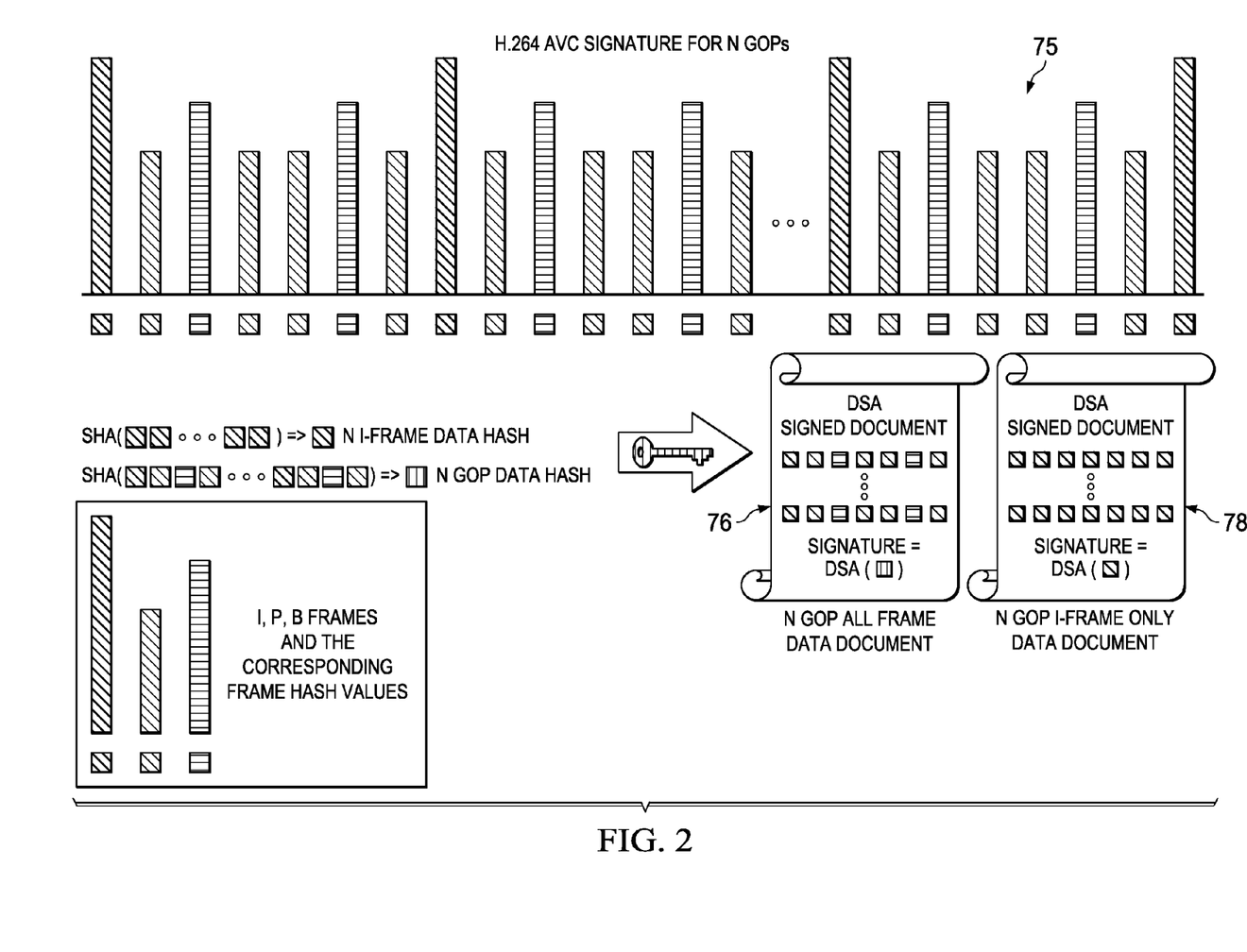
FIG. 2 is a simplified schematic diagram illustrating an example flow associated with the cryptographic video verification system in accordance with one embodiment of this disclosure.

Turning to FIG. 2, FIG. 2 is a simplified schematic diagram 75 illustrating an example H.264 advanced video coding (AVC) signature for N GOPs. In this particular example, there are two digital signature algorithm (DSA) signed documents 76 and 78. Note that the activities of FIG. 2 are best understood in the context of an example flow, which has been provided by FIG. 3.

Figure 3:
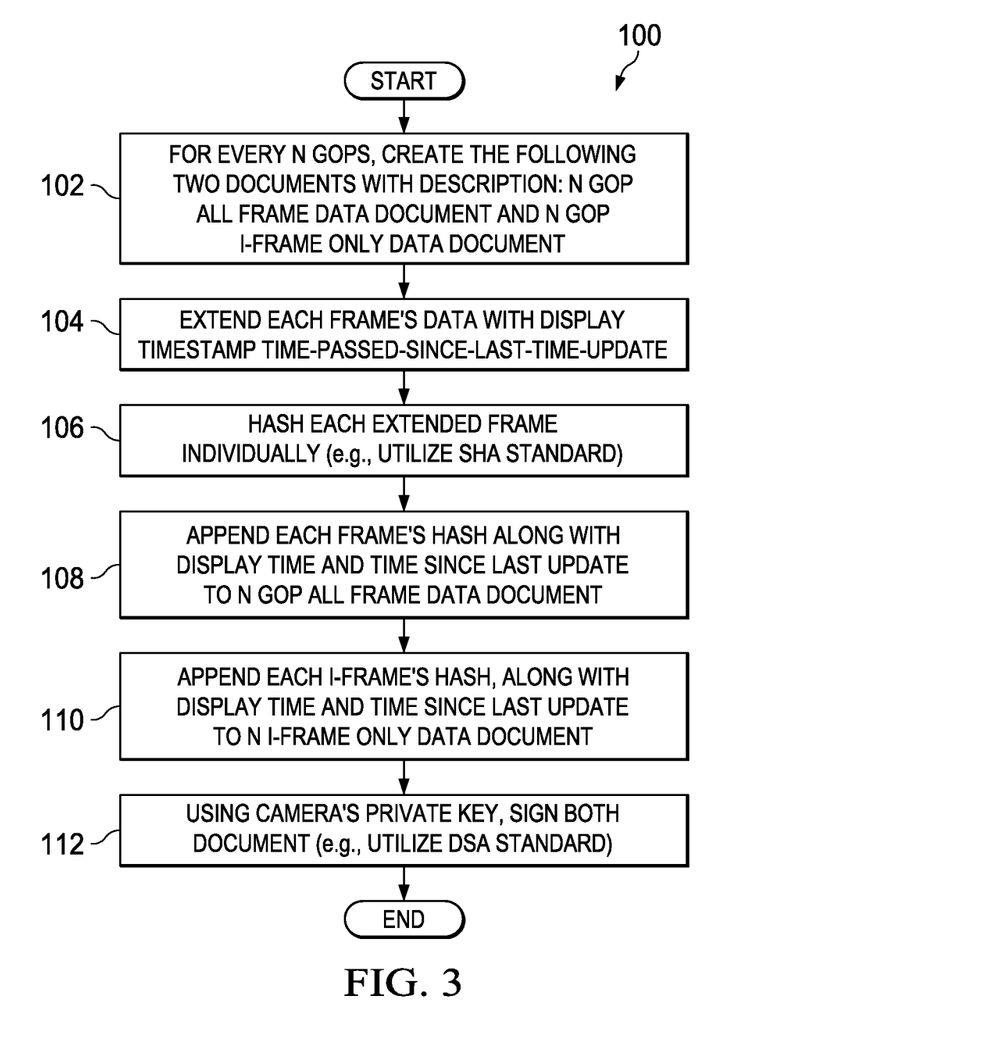
FIGS. 3-4 are simplified flow diagrams illustrating potential operations that may be associated with example embodiments of the cryptographic video verification system.

FIG. 3 is a simplified flow diagram 100 associated with example activities of the present disclosure. In operation of an example flow, cameras and VSOMs can be mutually authenticated. Post-authentication, a camera generating video can perform the following steps to generate verifiable video data.

At 102, for every N GOPs, the system creates the following two documents with the descriptions: N GOP all frame data document and N GOP I-Frame only data document. At 104, the system is configured to extend each frame's data with a display timestamp (time-passed-since-last-time-update). At 106, the system can hash each extended frame individually (e.g., utilizing a Secure Hash Algorithm (SHA) standard). At 108, the system can append each frame's hash, along with the display time and time since the last update, to the N GOP all frame data document. At 110, the architecture is configured to append each I-frame's hash, along with the display time and time since the last update, to the N I-Frame only data document. At 112, using the camera's private key, the system can sign both documents (e.g., utilizing DSA standard).

The signed hash documents can then be transmitted, via reliable transport, to the server where they can be used for verification during playback (e.g., using a suitable media player). Since the hash is computed on a frame-by-frame basis, and transmitted reliably for N GOPs, every frame received can be validated independently even with frame loss. Additionally, when video is thinned by selectively dropping P and B frames, the verification can switch to using the N GOP I-Frame only document and discard (or stop using) the N GOP all frame data document.

More specifically addressing the potential for packet drops, because the hash is computed on a frame-by-frame basis, and transmitted reliably for N GOPs, every frame received can be validated independently of frames dropped due to packet drops. Any missing frame is clearly identifiable from the documents. Employing two documents helps keep the verification overhead around 1% even after video thinning.

In regards to the display time security, in order to ensure that an administrator does not change the time on the camera and records a new verified clip, the following safeguards can be provisioned. The "time-passed-since-last-time-update" is embedded along with the display time. Any video with a low value of time-passed-since-last-time-update would be viewed as less secure. Any large administrative time changes can be logged, hashed, and signed in "event" order with old and new timestamps. For the packaging of video data and signatures, on transport, the extra information for video verification can simply be sent over a reliable transport. For video export, the MP4 container format can be extended to carry the extra data, as further detailed below.

Figure 4:
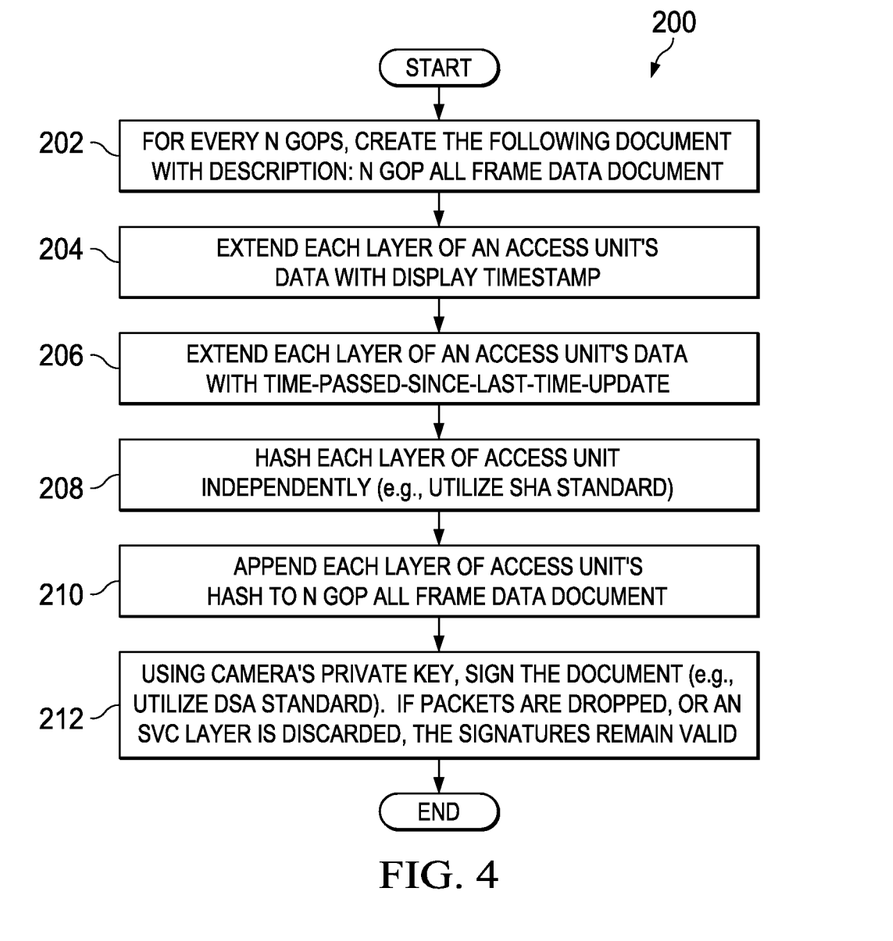

Turning to FIG. 4, FIG. 4 is a simplified flow diagram 200 (similar to the scheme described above) for H.264SVC. The flow may begin at 202, for every N GOPs, the system can create the following document with the description: N GOP all frame data document. At 204, the architecture extends each layer of an access unit's data with a display timestamp. At 206, the architecture extends each layer of an access unit's data with a time-passed-since-last-time-update. At 208, the architecture hashes the layer of the access unit independently (e.g., utilizing a SHA standard). At 210, the architecture can append each layer of the access unit's hash to the N GOP all frame data document. At 212, using the camera's private key, the system can sign the document (e.g., utilizing a DSA standard). If packets are dropped, or an SVC layer is discarded, the signatures would remain valid.

Figure 5:
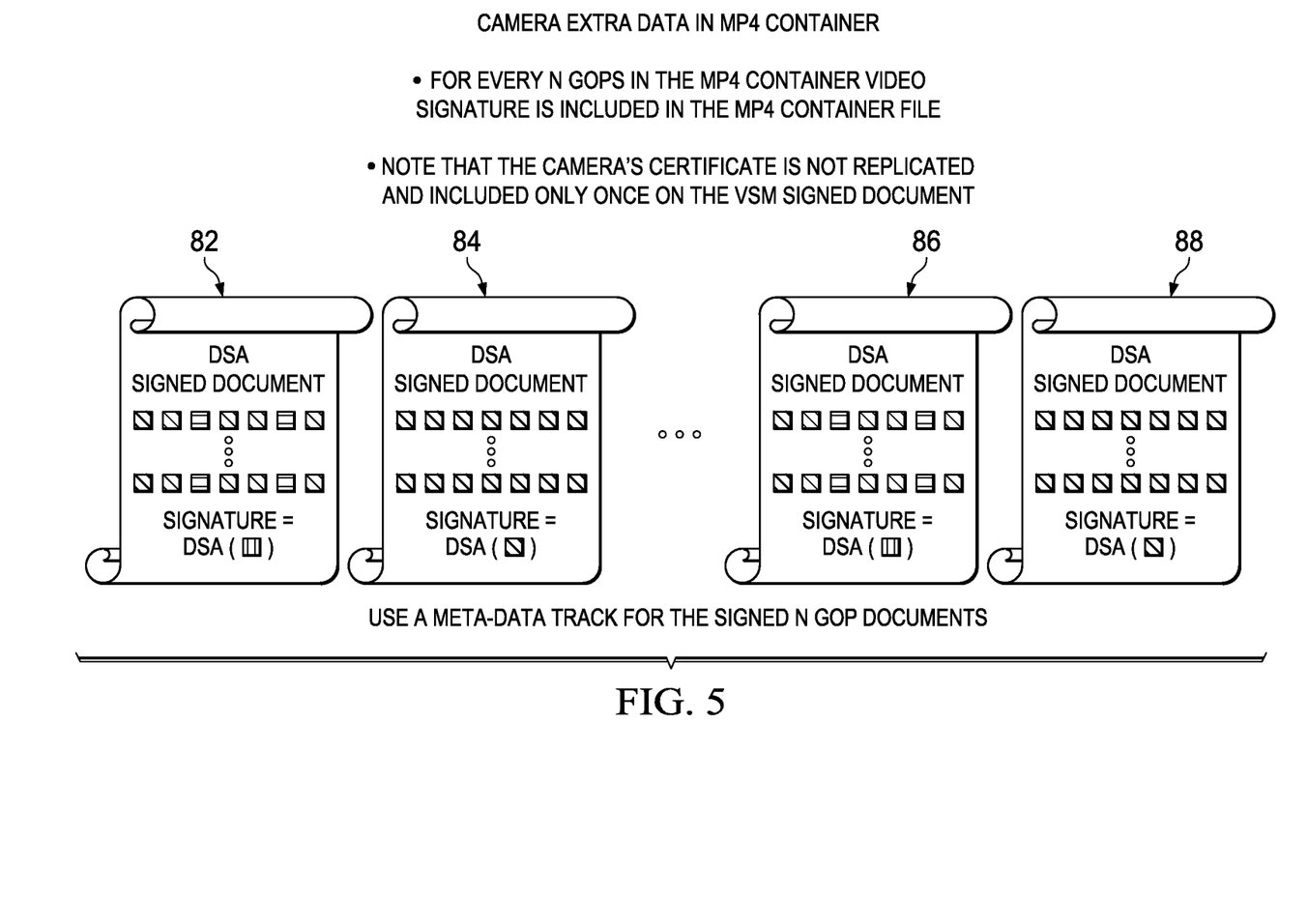
FIG. 5 is a simplified block diagram illustrating an example container associated with the cryptographic video verification system.
Figure 6:
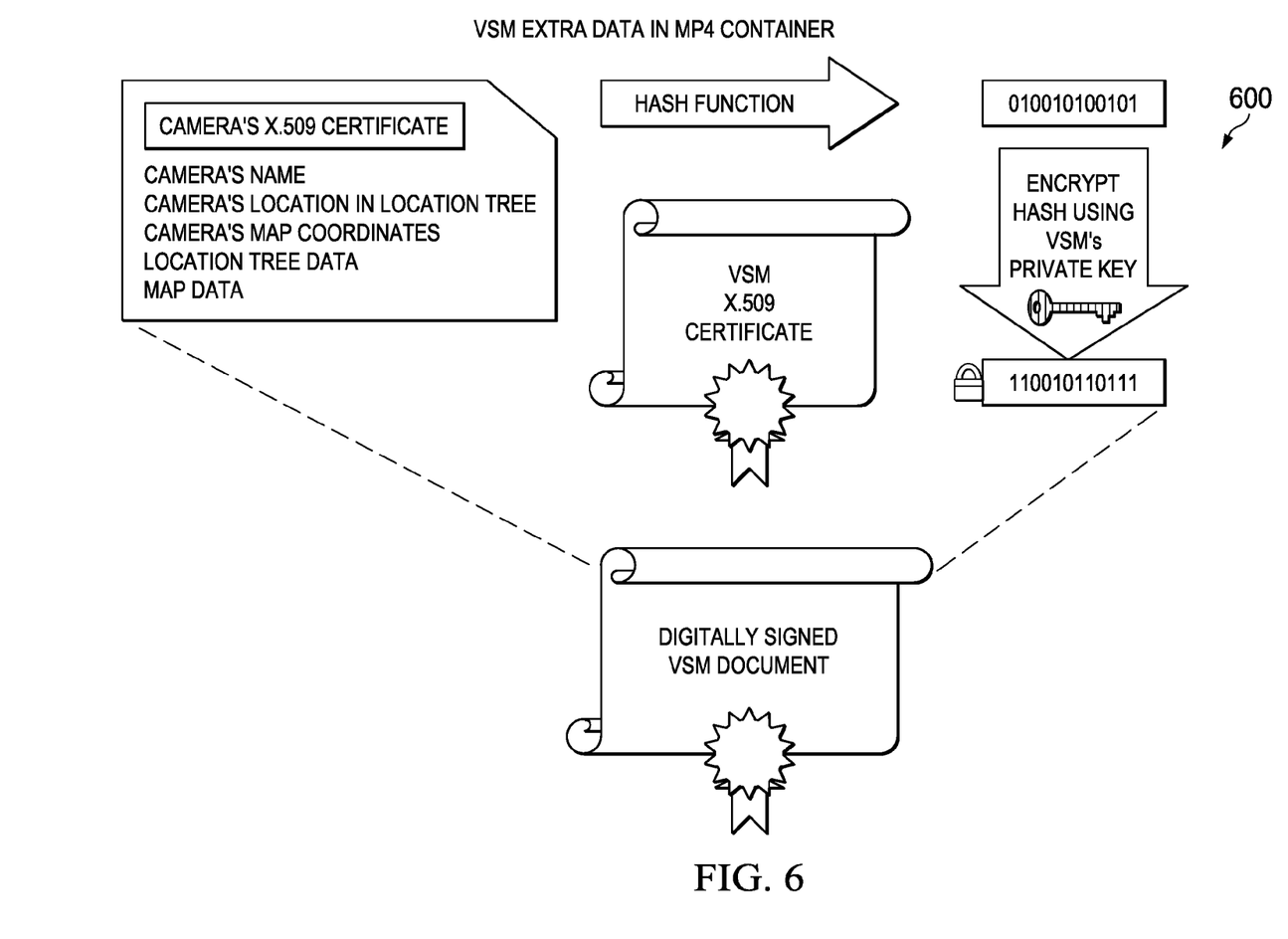
FIG. 6 is a simplified block diagram illustrating another example container associated with the cryptographic video verification system.

FIG. 5 is a simplified block diagram illustrating camera extra data in an MP4 container. The illustration of FIG. 5 includes a plurality of DSA signed documents 82, 84, 86, and 88. For every N GOPs in the MP4 container, a video signature is included in the MP4 container file. Note that the camera's certificate is not replicated and simply included once on the video surveillance manager (VSM) signed document. [Note that the terms VSM and video surveillance operations manager (VSOM) are used interchangeably herein in this document. Both represent instances of a video surveillance manager function.] A metadata track can be used for the signed N GOP documents. FIG. 6 is a simplified block diagram 600 illustrating VSM extra data in an MP4 container. Note that this container could optionally be used in conjunction with the present disclosure. In this particular illustration, the camera's X.509 certificate is provided, along with information associated with the camera name, camera location, camera map coordinates, location tree data, map data, etc., and signed by VSM's certificate, establishing a chain of trust providing ownership of a camera by the organization owning the VSM.

Note that the nodes of cryptographic video verification system 10, including camera 14a, viewer 30, and VSOM 44, are representative of any suitable network element that can exchange video data. This network element terminology is meant to encompass network appliances, cameras, computers, servers, video players, handheld devices, routers, switches, gateways, bridges, loadbalancers, modules, or any other device, component, element, or object operable to exchange information in a network environment. The nodes can also be representative of any suitable endpoints, which can have various potential applications. The network elements are configured to receive and/or capture data for subsequently propagating video communications over the network.

In one particular implementation, the network elements are representative of IP cameras that can be used for virtually any purpose (e.g., surveillance, advertisements, security, logging operations, amusement, maintenance activities, etc.). The term 'IP camera' is inclusive of analog cameras, and any other suitable endpoint device that could similarly be used in activities relating to capturing video. For example, the broad term 'camera' is inclusive of (or associated with) devices used to capture video such as any type of a personal digital assistant (PDA), a laptop or electronic notebook, a cellular telephone, an iPhone, an IP phone, iPad, a Telepresence system, a Skype mechanism, or any other device, component, element, or object capable of initiating or facilitating audio, video, media, or data exchanges within a network environment.

In their configurations, the network elements may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

In regards to the internal structure associated with the network elements of cryptographic video verification system 10, each of the cameras, VSOM 44, viewer 30, and other nodes can include memory elements for storing information to be used in the operations outlined herein. Each of the cameras, VSOM 44, viewer 30, and other nodes may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, or in any other suitable component, device, element, or object where appropriate and based on particular needs. Any of the memory elements discussed herein should be construed as being encompassed within the broad term "memory element" or "memory." Information being used, tracked, sent, or received by camera 14a, VSOM 44, viewer 30, and other network elements could be provided in any database, manifest, register, queue, table, cache, control list, or other storage structure, all of which can be referenced at any suitable timeframe. Any such storage options may be included within the broad term "memory element" or "memory" as used herein.

In certain example implementations, the video security functions outlined herein may be implemented by logic encoded in one or more non-transitory tangible media (e.g., embedded logic provided in an ASIC, digital signal processor (DSP) instructions, software (potentially inclusive of object code and source code) to be executed by a processor, or other similar machine, etc.). In some of these instances, memory elements can store data used for the operations described herein. This includes the memory elements being able to store software, logic, code, or processor instructions that are executed to carry out the activities described herein.

In one example implementation, camera 14a, VSOM 44, viewer 30, and/or other nodes may include software modules (e.g., instances of video verification module 60) to achieve, or to foster, the video security operations as outlined herein. In other embodiments, such operations may be carried out by hardware, implemented externally to these elements, or included in some other network device to achieve the intended functionality. Alternatively, these elements may include software (or reciprocating software) that can coordinate in order to achieve the operations, as outlined herein. In still other embodiments, one or all of these devices may include any suitable algorithms, hardware, software, components, modules, interfaces, or objects that facilitate the operations thereof.

Additionally, each of the cameras, VSOM 44, viewer 30, and/or other nodes may include one or more processors (or virtual processors) that can execute software or an algorithm to perform activities as discussed herein. A processor or virtual processor can execute any type of instructions associated with the data to achieve the operations detailed herein. In one example, a processor (such as shown in FIG. 1) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, code, electronic instructions, or any suitable combination thereof. Any of the potential processing elements, modules, and machines described herein should be construed as being encompassed within the broad term "processor."

In the examples provided above, as well as numerous other potential examples, interaction may be described in terms of two, three, or four network elements. However, the number of network elements has been limited for purposes of clarity and example only. In certain cases, it may be easier to describe one or more of the functionalities of a given set of operations by only referencing a limited number of network elements. It should be appreciated that cryptographic video verification system 10 is readily scalable and can accommodate a large number of components, as well as more complicated/sophisticated arrangements and configurations. Accordingly, the examples provided should not limit the scope or inhibit the broad teachings of cryptographic video verification system 10 as potentially applied to a myriad of other architectures. Additionally, although described with reference to particular scenarios, where a particular module is provided within a network element, these modules can be provided externally, or consolidated and/or combined in any suitable fashion. In certain instances, such modules may be provided in a single proprietary unit.

It is also important to note that the appended diagrams illustrate only some of the possible scenarios and patterns that may be executed by, or within, cryptographic video verification system 10. For example, some operations may be deleted or removed where appropriate, or these operations may be modified or changed considerably without departing from the scope of teachings provided herein. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by cryptographic video verification system 10 in that any suitable arrangements, chronologies, configurations, and timing mechanisms may be provided without departing from the teachings provided herein.

Additionally, although the present disclosure has been described in detail with reference to particular embodiments, it should be understood that various other changes, substitutions, and alterations may be made hereto without departing from the spirit and scope of the present disclosure. While the previous discussions have focused on certain content applications, other architectures and protocols could readily adopt the teachings of the present disclosure. For example, the present disclosure can be used in conjunction with law enforcement activities, court proceedings (e.g., depositions, trials, oral arguments, etc.), elections in which votes are cast by a populace, etc. Additionally, the present disclosure can be extended for authenticating voice data. Moreover, the present disclosure can be applicable to virtually any surveillance applications (e.g., building security, digital advertising (e.g., involving proof-of-play), casino environments, sports entertainment venues, concerts, etc.). Furthermore, the architecture of the present disclosure could be equally applicable to any media server applications, as well as video conferencing scenarios in which communications occur in real-time (e.g., on-demand), where speech and video data can effectively be captured.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:
1. A method, comprising:
   capturing video data for an individual camera, wherein the video data comprises a plurality of video frames and wherein each of the plurality of video frames comprises frame data that is associated with one of: I-frame data, P-frame data and B-frame data;
   generating a first document and a second document associated with the video data;

extending a size of the frame data for each of the plurality of video frames associated with the video data to generate extended frame data for each of the plurality of video frames, wherein the extended frame data for each of the plurality of video frames includes a respective display time for each video frame and a respective display timestamp for each video frame, wherein the display timestamp for each video frame is associated with a time passed since a last time update for each video frame;

hashing the extended frame data for each of the plurality of video frames individually;

appending to the first document, for each of the plurality of video frames, each hash of the extended frame data for each of the plurality of video frames, each respective display time for each of the plurality of video frames and each respective display timestamp for each of the plurality of video frames;

appending to the second document, for each of a plurality of video frames comprising I-frame data, each hash of the extended frame data for each of the plurality of video frames comprising I-frame data, each respective display time for each of the plurality of video frames comprising I-frame data and each respective display timestamp for each of the plurality of video frames comprising I-frame data, wherein the appending to the second document excludes appending the second document for any video frames comprising P-frame data and B-frame data;

signing the first document and the second document using a private key for the camera;

communicating the video data, the first document and the second document over a network to a next destination; and verifying one or more individual video frames of the video data received over the network based on at least one of the first document and the second document.

2. The method of claim 1, further comprising:
using the first and second documents to verify an authenticity of at least a portion of the video data.

3. The method of claim 1, wherein the generated first document includes I-frame data, P-frame data and B-frame data associated with the GOPs video data.

4. The method of claim 1, wherein the generated second document includes I-frame data associated with the video data.

5. The method of claim 1, the method further comprising:
authenticating the camera; and
capturing the video data after the camera has been authenticated.

6. The method of claim 1, further comprising:
determining that a particular portion of the video data has been thinned via frame dropping of P and B frames; and
utilizing the second document to process additional video data without utilizing the first document.

7. Logic encoded in one or more non-transitory media that includes code for execution that when executed by one or more processors cause the one or more processors to:
capture video data for an individual camera, wherein the video data comprises a plurality of video frames and wherein each of the plurality of video frames comprises frame data that is associated with one of: I-frame data, P-frame data and B-frame data;
generate a first document and a second document associated with the video data;
extend a size of the frame data for each of the plurality of video frames associated with the video data to generate extended frame data for each of the plurality of video frames, wherein the extended frame data for each of the plurality of video frames includes a respective display time for each video frame and a respective display timestamp for each video frame, wherein the display timestamp for each video frame is associated with a time passed since a last time update for each video frame;
hash the extended frame data for each of the plurality of video frames individually;
append to the first document, for each of the plurality of video frames, each hash of the extended frame data for each of the plurality of video frames, each respective display time for each of the plurality of video frames and each respective display timestamp for each of the plurality of video frames;
append to the second document, for each of a plurality of video frames comprising I-frame data, each hash of the extended frame data for each of the plurality of video frames comprising I-frame data, each respective display time for each of the plurality of video frames comprising I-frame data and each respective display timestamp for each of the plurality of video frames comprising I-frame data, wherein the appending to the second document excludes appending the second document for any video frames comprising P-frame data and B-frame data;
digitally sign the first document and the second document using a digital signature algorithm (DSA) and a private key for the camera;
communicate the first document and the second document over a network to a next destination; and
verify one or more individual video frames of the video data received over the network based on at least one of the first document and the second document.

8. The logic of claim 7, wherein the code for execution further causes the one or more processors to:
use the first and second documents to verify an authenticity of at least a portion of the video data.

9. The logic of claim 7, wherein the generated first document includes I-frame data, P-frame data and B-frame data associated with the video data.

10. The logic of claim 7, wherein the generated second document includes I-frame data associated with the video data.

11. The logic of claim 7, wherein the code for execution further causes the one or more processors to:
authenticate the camera; and
capture the video data after the camera has been authenticated.

12. The logic of claim 7, wherein the code for execution further causes the one or more processors to:
determine that a particular portion of the video data has been thinned via frame dropping of P and B frames; and
utilize the second document to process additional video data without utilizing the first document.

13. An apparatus, comprising:
a processor;
a video verification module; and
a memory coupled to the processor, wherein the processor is configured to execute instructions that cause the processor to:
capture video data for an individual camera, wherein the video data comprises a plurality of video frames and wherein each of the plurality of video frames comprises frame data that is associated with one of: I-frame data, P-frame data and B-frame data;
generate a first document and a second document associated with the video data;
extend a size of the frame data for each of the plurality of video frames associated with the video data to generate extended frame data for each of the plurality of video frames, wherein the extended frame data for each of the plurality of video frames includes a respective display time for each video frame and a respective display timestamp for each video frame, wherein the display timestamp for each video frame is associated with a time passed since a last time update for each video frame;

hash the extended frame data for each of the plurality of video frames individually;

append to the first document, for each of the plurality of video frames, each hash of the extended frame data for each of the plurality of video frames, each respective display time for each of the plurality of video frames and each respective display timestamp for each of the plurality of video frames;

append to the second document, for each of a plurality of video frames comprising I-frame data, each hash of the extended frame date for each of the plurality of video frames comprising I-frame data, each respective display time for each of the plurality of video frames comprising I-frame data and each respective display timestamp for each of the plurality of video frames comprising I-frame data, wherein the appending to the second document excludes appending the second document for any video frames comprising P-frame data and B-frame data;

digitally sign the first document and the second document using a digital signature algorithm (DSA) and a private key for the camera;

communicate the first document and the second document over a network to a next destination; and verify one or more individual video frames of the video data received over the network based on at least one of the first document and the second document.

14. The apparatus of claim 13, wherein the generated first document includes I-frame data, P-frame data and B-frame data associated with the video data, and the generated second document includes I-frame data associated with the video data.

15. The apparatus of claim 13, wherein the apparatus is further configured to:

determine that a particular portion of the video data has been thinned via frame dropping of P and B frames; and utilize the second document to process additional video data without utilization of the first document.

16. The apparatus of claim 13, wherein the apparatus is further configured to:

authenticate the camera; and capture the video data after the camera has been authenticated.

* * * * *